United States Patent [19]
Yamamoto et al.

[11] Patent Number: 5,655,170
[45] Date of Patent: Aug. 5, 1997

[54] ELECTRO-DEVELOPING TYPE CAMERA USING ELECTRO-DEVELOPING RECORDING MEDIUM

[75] Inventors: Yasuhiro Yamamoto; Koichi Sato; Tahei Morisawa, all of Tokyo, Japan

[73] Assignee: Asahi Kogaku Kogyo Kabushiki Kaisha, Tokyo, Japan

[21] Appl. No.: 671,256

[22] Filed: Jun. 26, 1996

[30] Foreign Application Priority Data

Jun. 26, 1995 [JP] Japan .................................. 7-182095

[51] Int. Cl.⁶ .................... G03B 19/02; H04N 5/225; H04N 5/222
[52] U.S. Cl. .................... 396/429; 396/661; 348/207; 348/370
[58] Field of Search .................... 348/207, 344, 348/370, 371; 355/217, 220, 271; 396/177, 178, 429, 661

[56] References Cited

U.S. PATENT DOCUMENTS

| | | | |
|---|---|---|---|
| 4,757,387 | 7/1988 | Saito | 358/225 |
| 5,115,308 | 5/1992 | Onuki | 358/102 |
| 5,298,947 | 3/1994 | Aono et al. | 355/211 |
| 5,299,153 | 3/1994 | Takanashi et al. | 365/112 |
| 5,315,334 | 5/1994 | Inana | 354/219 |
| 5,315,410 | 5/1994 | Takanshi et al. | 358/471 |
| 5,424,156 | 6/1995 | Aoki et al. | 430/59 |
| 5,448,331 | 9/1995 | Hamada et al. | 354/403 |
| 5,475,441 | 12/1995 | Parulski et al. | 348/552 |
| 5,565,941 | 10/1996 | Kaneko | 396/177 |

FOREIGN PATENT DOCUMENTS

| | | |
|---|---|---|
| 0327236 | 8/1989 | European Pat. Off. . |
| 2-29081 | 1/1990 | Japan . |
| 3-15087 | 1/1991 | Japan . |
| 3278342 | 12/1991 | Japan . |
| 5-2280 | 1/1993 | Japan . |
| 5-24706 | 4/1993 | Japan . |
| 5150251 | 6/1993 | Japan . |
| 6313894 | 11/1994 | Japan . |

*Primary Examiner*—Safet Metjahic
*Assistant Examiner*—John Chizmar
*Attorney, Agent, or Firm*—Greenblum & Bernstein P.L.C.

[57] ABSTRACT

An electro-developing type camera using an electro-developing recording medium has a photographing lens system for forming an optical image of an object to be photographed in the recording medium, and an electronic flash for emitting light rays to illuminate the object at an execution of a photographing operation, if necessary. The camera further has an image reader for optically and electronically reading the formed image of the recording medium, and an optical guide system for guiding the light rays, emitted from the electronic flash to the recording medium to illuminate the formed image thereof during the optical and electronic reading of the formed image of the recording medium.

10 Claims, 11 Drawing Sheets

ELECTRO-DEVELOPING TYPE CAMERA USING ELECTRO-DEVELOPING RECORDING MEDIUM

BACKGROUND OF THE INVENTION

1. Field of the Invention

The present invention relates to an electro-developing type video camera using an electro-developing recording medium in which an optical image obtained through a photographing lens system is electronically and directly recorded and developed as a visible image in very little time.

2. Description of the Related Art

Such an electro-developing recording medium, per se is known. For example, Japanese Unexamined Patent Publication No. 5-2280 and U.S. Pat. No. 5,424,156 disclose one type of electro-developing recording medium comprising an electrostatic information recording medium and an electric charge keeping medium. The electrostatic information recording medium includes a photoconducting layer and an inorganic oxide material layer, and the electric charge keeping medium includes a liquid crystal display, both the mediums being combined to face each other with a small gap therebetween. An electro-developing type camera using the electro-developing recording medium is already proposed, and is referred to as an electro-developing type camera hereinafter.

In the electro-developing type camera, a voltage is applied between the electrostatic information recording medium and the electric charge keeping medium, and an optical image is formed on the electrostatic information recording medium by a photographing lens system, during the application of the voltage. An electric charge distribution is produced over the electrostatic information recording medium in accordance with a light intensity distribution of the optical image formed thereon, so that the intensity of an electric field acts on the liquid crystal of the electric charge keeping medium in accordance with the electric charge distribution. Thus, an image derived from the optical image is reproduced in the electric charge keeping medium as a visible image. Namely, as soon as the optical image is formed on the electrostatic information recording medium, the image is developed in the electric charge keeping medium.

The electro-developing type camera also includes an image reader comprising a CCD (charge-coupled device) line sensor for optically and electronically reading the image recorded and developed in the electro-developing recording medium, and the read image signals obtained from the CCD line sensor may be processed in various manners. For example, the read image signals may be stored in second recording medium, such as an IC memory card, a floppy disk a hard disk or the like. Also, the read image signals may be transferred from the camera to an external processing device such as computer, a printer, a TV monitor and so on for reproducing the image thereby.

The provision of the image reader results in the camera being bulky, because the image reader further comprises a light source for illuminating the developed image of the electro-developing recording medium, and an optical lens system for focusing the illuminated image at a light receiving surface of the CCD line sensor, and because the image reader must be relatively moved with respect to the electro-developing recording medium, such that the recorded and developed image held therein can be scanned with the light source associated with the CCD line sensor.

Accordingly, it is desirable that the image reader be compactly constituted for the electronic color still video camera's bulkiness to be reduced.

Therefore, an object of the present invention is to provide an electronic color still video camera having an electro-developing recording mediume, and constituted such that an image reader for optically and electronically reading an image recorded and developed on the electro-developing recording medium is compactly arranged so that a size of the camera can become as small as possible.

In accordance with the present invention, there is provided an electro-developing type camera using an electro-developing recording medium, comprising: photographing means for forming an optical image of an object to be photographed in the electro-developing recording medium; flash means for emitting light rays to illuminate the object at an execution of a photographing operation, if necessary; image-sensing means for optically and electronically sensing (or reading) the image formed in the electro-developing recording medium; and optical guide system means for guiding the light rays, emitted from the flash means, to the electro-developing recording medium to illuminate the formed image thereof during the optical and electronic sensing executed by the image-sensing means.

In this camera, the flash means may be constituted as a pop-up type flash which is movable between a pop-up position for the photographing operation and a stowed position for the optical and electronic sensing of the formed image of the electro-developing recording medium. In this case, the camera may further comprise: position detection means for detecting which position of the flash means is selected; means for disabling the photographing operation when positioning the flash means at the stowed position; and means for disabling the optical and electronic sensing or reading of the formed image of the electro-developing recording medium when positioning the flash means at the pop-up position.

Preferably, the optical and electronic sensing (or reading) of the formed image of the electro-developing recording medium is carried out as a scanning operation, in which the formed image of the electro-developing recording medium is scanned by the illumination of light rays guided by the optical guide means. In this case, the camera may further comprise: optical detection means for a part of the light rays emitted from the flash means; and emission controlling means for controlling the emission of light rays from the flash means so as to keep an amount of light rays for the illumination of the formed image of the electro-developing recording medium constant at each of plural scanning steps.

Preferably, the image-sensing means includes a carriage member carrying a scanner mirror, a scanner optical system, and a line sensor aligned with each other and supported thereby, and is intermittently moved step by step along the electro-developing recording medium during the scanning operation, such that the electro-developing recording medium passes through a space between the scanner mirror and scanner optical system. The scanner mirror is arranged to reflect the light rays, guided by the optical guide means, to the scanner optical system by which the light rays are focussed on a linear light receiving surface of the line sensor.

In accordance with the present invention, there is also provided an electro-developing type camera using an electro-developing recording medium, comprising: photographing means for forming an optical image of an object to be photographed in the electro-developing recording medium; flash means for emitting light rays to illuminate the object at an execution of a photographing operation, if necessary; image sensing means for executing a scanning operation to optically and electronically sense or read the formed image of the electro-developing recording medium, the scanning operation including a plurality of scanning steps carried out by intermittently and relatively moving step by step the image reader means with respect to the formed image of the electro-developing recording medium; and optical guide system means for guiding the light rays, emitted from the flash means, to the image sensing means which illuminates the formed image of the electro-developing recording medium with the guided light rays for the optical and electronic sensing of the formed image thereof, wherein the emission of light rays from the flash means is carried out whenever each of the scanning steps of the scanning operation is executed by the image sensing means.

Similar to the first-mentioned camera, the flash means may be constituted as a pop-up type flash which is movable between a pop-up position for the photographing operation and a stowed position for the scanning operation. In this cases the camera may further comprise: position detection means for detecting which position of the flash means is selected; means for disabling the photographing operation when positioning the flash means at the stowed position; and means for disabling the scanning operation when positioning the flash means at the pop-up position. The camera may further comprise: optical detection means for detecting a part of the light rays emitted from the flash means; and emission controlling means for controlling the emission of light rays from the flash means so as to keep an amount of light rays for the illumination of the formed image of the electro-developing recording medium constant at each of the scanning steps of the scanning operation.

BRIEF DESCRIPTION OF THE DRAWINGS

These objects and other objects of the present invention will be better understood from the following description, with reference to the accompanying drawings in which.

DESCRIPTION OF THE PREFERRED EMBODIMENTS

Figure 1:
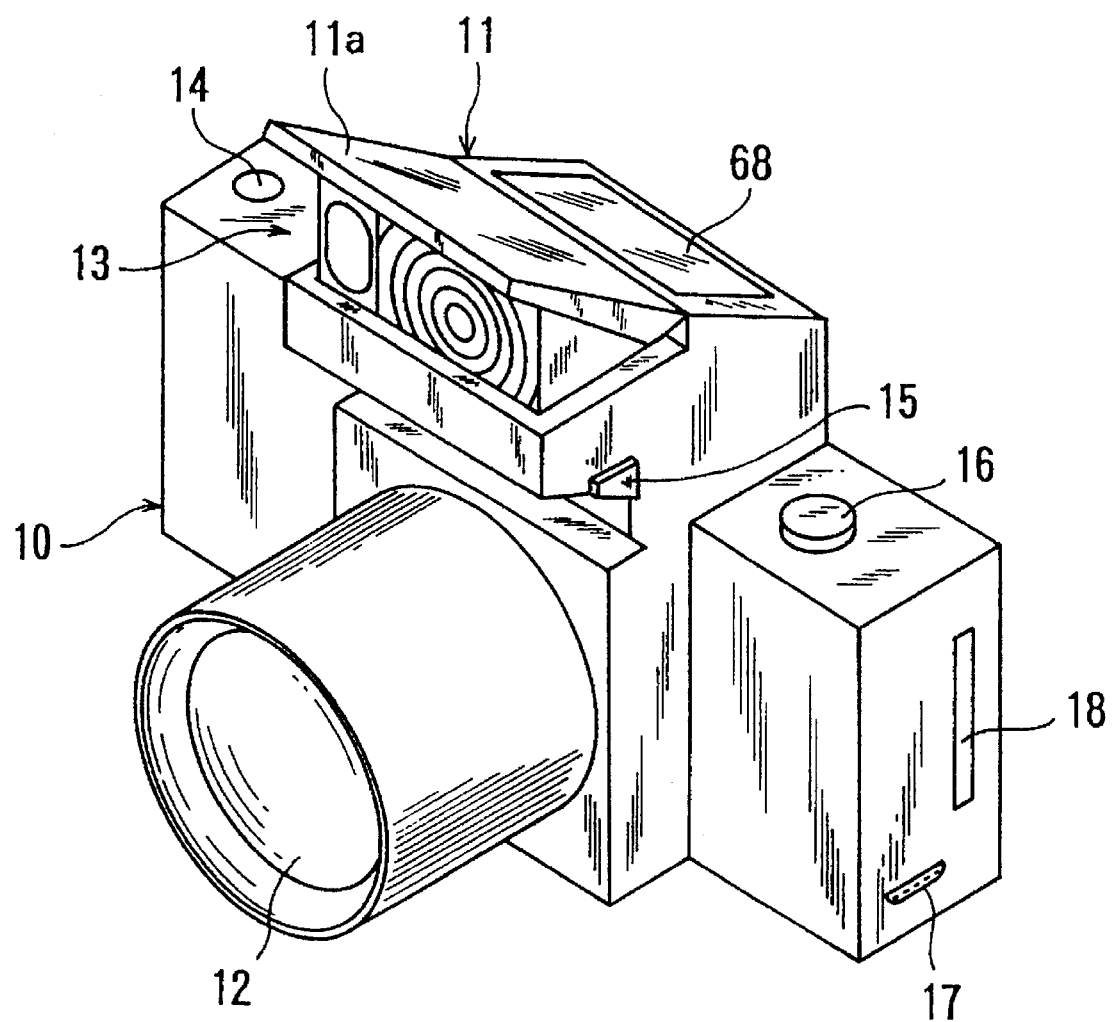
FIG. 1 is a schematic perspective view showing an appearance of an embodiment of an electro-developing type camera according to the present invention.

FIG. 1 is an external view of an electro-developing type camera using an electro-developing recording medium, which is constructed in accordance with the present invention, and the camera comprises a camera body generally indicated by reference 10. The camera body 10 has a photographing optical system 12 provided on approximately a center location of a front face thereof.

Also, the camera body 10 has a head portion 11 provided at a center location of an upper face thereof. An electronic flash 13 is provided in the head portion 11, and is associated with a movable lid element 11a forming a forward section of a top of the head portion 11. The electronic flash 12 is constructed in pop-up fashion, and is movable between a pop-up position, shown in FIG. 1, and a position depressed and stowed in the camera body 11. The electronic flash 13 is provided with a mechanical release button 15, and is resiliently popped up from the stowed position to the pop-up position by manually depressing the release button 15. An LCD (liquid crystal display) panel 68 is provided on a rear section of the top of the head portion 11 for displaying various setting conditions of the camera, suitable messages and so on.

A release switch 14 and scan start switch 16 are provided in the upper face of the camera body 10 at the opposite sides of the head portion 11. When the release switch 14 is depressed and turned ON, the camera executes a photographing operation so that an optical image photographed by the photographing optical system 12 is recorded and developed in an electro-developing recording medium held in the camera. Successively, when the scan start switch 16 is depressed and turned ON, the camera executes a scanning operation for optically and electronically reading the image recorded and developed in the electro-developing recording medium, to thereby produce image signals.

The camera boy 10 has an interface connector 17 provided on a side face thereof, and the image signals may be transfered to an external processing device, such as computer, a printer, a TV monitor and so on through the interface connector 17. The camera body 10 also has a slot 18 formed in a side face thereof, and an IC memory card (not shown) is inserted into the camera through the slot 18. The image signals may be stored in the IC memory card inserted into the slot 18.

Figure 2:
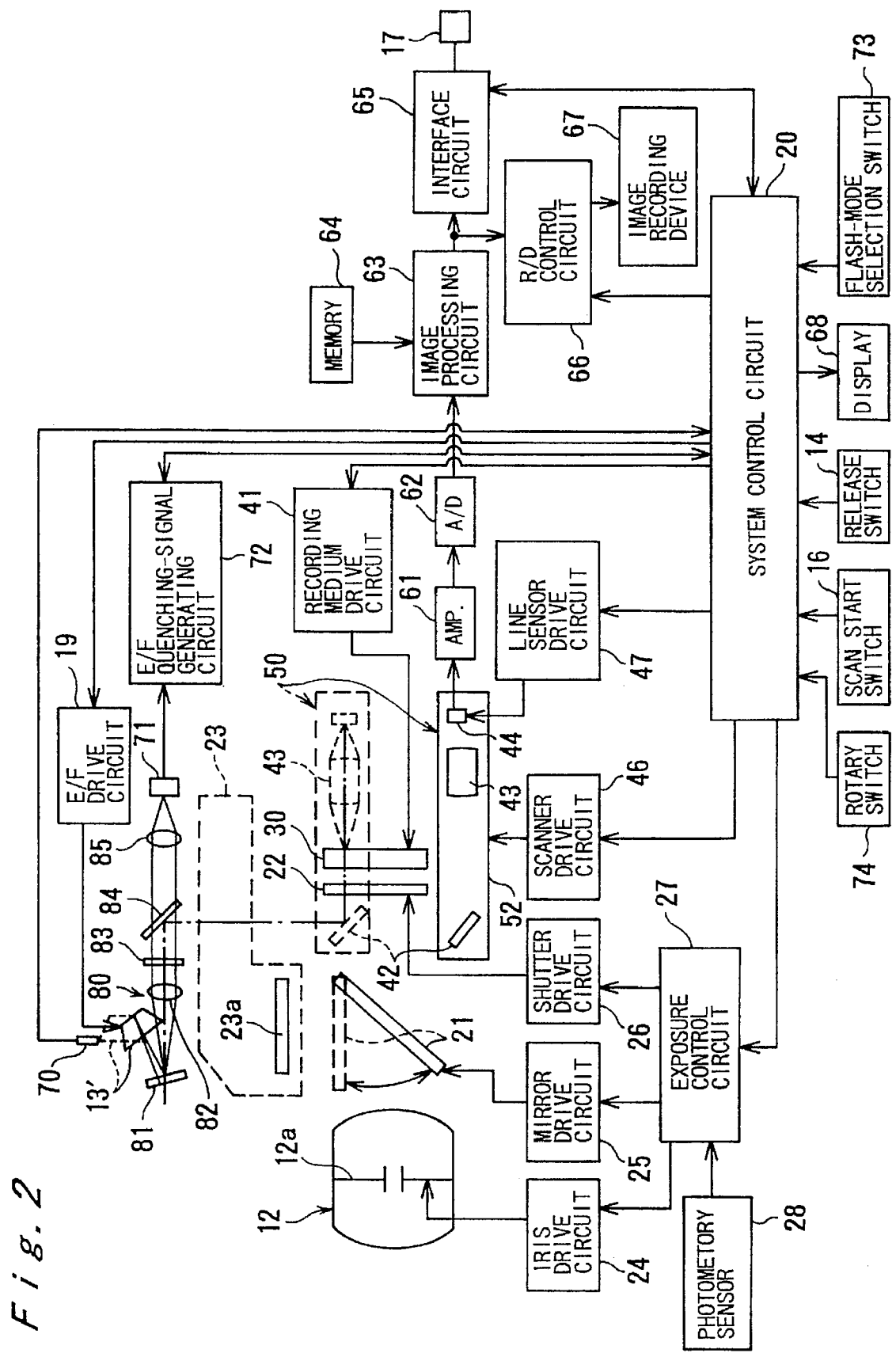
FIG. 2 is a block diagram of the electro-developing type camera shown in FIG. 1.

FIG. 2 shows a block diagram of the electro-developing type camera as shown in FIG. 1, in which a system control circuit 20 including a micro-computer or micro-processor is provided to control the camera as a whole.

The photographing optical system 12 includes not only a plurality of lens groups but also an aperture 12a incorporated therein, and the electro-developing recording medium, indicated by reference 30, is disposed behind the photographing optical system 12. A quick return mirror 21 is placed between the photographing optical system 12 and the electro-developing recording medium 30, and a shutter 22 is provided between the quick return mirror 21 and the electro-developing recording medium 30. A view finder optical system 23 is provided in the head portion of the camera body 10 below the electronic flash 13, and a focusing glass 23a is disposed above the quick return mirror 21.

The aperture 12a, the quick return mirror 21 and the shutter 22 are driven by an iris drive circuit 24, a mirror drive circuit 25 and a shutter drive circuit 26, respectively. These drive circuits 24, 25 and 26 are controlled by an exposure control circuit 27 which is operated in accordance with command signals outputted from the system control circuit 20.

While an exposure is controlled, a degree of opening of the aperture 12a is adjusted by the iris drive circuit 24 under control of the exposure control circuit 27 based on an output signal of a photometry sensor 28.

The quick return mirror 21 is usually set to a down-position (an inclining position shown by the solid line in FIG. 2), and thus a light beam passing through the photographing optical system 12 is led to the view-finder optical system 23, so that an object to be photographed can be observed by a photographer. When the photographing operation is carried out, the quick return mirror 21 is rotated upward by the mirror drive circuit 25, and is then set to an up-position (a horizontal position shown by the broken line in FIG. 2), so that the light beam is directed to the shutter 22.

The shutter 22 is usually closed, and, upon performing the photographing operation, the shutter 22 is opened over a given period of time by the shutter drive circuit 26 under control of the exposure control circuit 27. Thus, during the photographing operation, the light beam passing through the photographing optical system 12 is led to the electro-developing recording medium 30 through the opened shutter 22, resulting in the forming of a two-dimensional optical image thereon.

When the photographing operation is executed, the electronic flash 13 may be utilized, if necessary. The electronic flash 13 includes a flashbulb, such as a xenon lamp indicated by reference 13' in FIG. 2, and the flashbulb 13' is electrically energized by an electronic flash drive circuit 19 operated under control of the system control circuit 20. In FIG. 2, the flashbulb 13' is shown by a broken line at the pop-up position, and is shown by a solid line at the stowed position. Of course, when the electronic flash 13 is utilized on the execution of the photographing operation, the flashbulb 13' is positioned at the pop-up position.

A pop-up detection switch or contact type switch, such as a microswitch 70, is incorporated in the electronic flash 13 to detect which position of the electronic flash 13 is selected. For example, the pop-up detection switch 70 is turned ON when positioning the electronic flash 13 at the pop-up positions and the pop-up detection switch 70 is turned OFF when positioning the electronic flash 13 at the stowed position.

During the execution of the photographing operation, a voltage is applied to the electro-developing recording medium 30 by a recording medium drive circuit 41 operated in accordance with a command signal outputted from the system control circuit 20. By exposing the electro-developing recording medium 30 during the application of the voltage thereto, an optical image formed by the photographing optical system 12 is recorded and developed in the electro-developing recording medium 30 as a visible image.

A scanning mechanism or image reader 50 is provided in the camera body 11 in the vicinity of the electro-developing recording medium 30, and executes a scanning operation for optically and electronically reading an image recorded and developed in the electro-developing recording medium 30. The image reader 50 includes a scanner mirror 42, a scanner optical system 43, and a line image sensor 44 which are supported by a carriage member 52, and these elements are aligned with each other such that the scanner optical system 43 is disposed between the scanner mirror 42 and the line image sensor 44.

The scanner mirror 42 is inclined so as to define an angle of 45 degrees (or 135 degrees) with respect to an optical axis defined by the scanner optical system 43. The line sensor 44 comprises a one-dimensional CCD (charge-coupled device) sensor having, for example, 2,000 pixels and forming a linear light receiving surface, and serves as a photoelectric-conversion device for sensing and converting an optical image into electric pixel signals. The line sensor 44 is driven by a line sensor drive circuit 47 operated under control of the system control circuit 20.

The carriage member 52 is movable between a lower position, shown by a solid line, and an upper position, shown by a broken line, as illustrated in FIG. 2. Both the shutter 22 and the electro-developing recording medium relatively pass through a space between the scanner mirror 42 and the scanner optical system 43 during the movement of the carriage member 52 between the lower position and the upper position. The carriage member 52 is driven by a suitable motor, such as a stepping motor, a servo-motor or the like (not shown in FIG. 2), and the motor is controlled by a scanner drive circuit 46 operated under the control of the system control circuit 20.

The image reader 50 also includes an optical guiding system indicated by reference 80. The optical guiding system 80 is associated with the flashbulb 13' placed at the stowed position, which forms a part of the image reader 50. The optical guiding system 80 includes: a reflecting mirror 81 opposed to the flashbulb 13' positioned at the stowed position; a collimating lens 82 for converting the light rays reflected by the mirror 81 into parallel light rays; a band-pass filter 83 for filtering the parallel light rays so as to separate a part of light rays having a given band of frequency therefrom; and a half mirror 84 for reflecting and directing a part of the filtered light rays toward the scanner mirror 42 disposed below the half mirror 84. The scanner mirror 42 reflects the light rays made incident thereupon to a linear light receiving surface of the line sensor 44 through the scanner optical system 43.

When an operation other than the scanning operation for optically and electronically reading the developed image of the electro-developing recording medium 30, e.g., the photographing operation, is executed, the carriage member 52 is at the lower position shown by the solid line in FIG. 2. When the scanning operation is initiated, the carriage member 52 is moved from the lower position to a scan start position, and then is intermittently moved step by step from the scan start position toward the upper position shown by the broken line in FIG. 2, such that the developed image of the electro-developing recording medium 30 is scanned with the light rays reflected by the scanner mirror 42 during the execution of the scanning operation. Note that the shutter 22 is opened during the execution of the scanning operation.

Of course, the scanner mirror 42 and the line sensor 44 are of suitable length to completely cover and extend over a horizontal width of the electro-developing recording medium 30, and a horizontal linear segment of the developed image of the electro-developing recording medium 30 is illuminated by the light rays reflected from the scanner mirror 42 at each of the steps of the intermittent movement of the carriage member 52 during the execution of the scanning operation. The light rays passing through the horizontal linear segment of the developed image and carrying image information thereon are focussed on the linear light receiving surface of the line sensor 44 through the scanner optical system 43. Namely, the linear segment of the developed image is optically and electronically sensed or read by the liner sensor 44. A number of the horizontal linear segments of the developed image depends upon a pitch of the steps of the intermittent movement of the carriage member 52, and the reading of the horizontal linear segments of the developed image is continued until the carriage member 52 reaches the upper position.

When the electronic flash 13 is utilized upon executing the photographing operation, the flashbulb 13' is electrically energized by the electronic flash drive circuit 19, as mentioned above. Similarly, the electrical energization of the flashbulb 13' by the electronic flash drive circuit 19 is carried out during the execution of the scanning operation. Nevertheless, the electrical energization of the flashbulb 13' for the scanning operation must be controlled in such a manner that each of the horizontal segments of the developed image is always illuminated with a constant quantity of light, before all of the horizontal linear segments of the developed image of the electro-developing recording medium 30 can be evenly and homogeneously sensed or read by the line sensor 44.

To this end, the camera is provided with a photometry sensor 71 associated with the optical guiding system 80. In particular, the optical guiding system 80 further includes a focusing lens 85 disposed behind the half mirror 84, and the remaining part of the filtered light rays passing through the half mirror 84 are focussed on a light receiving surface of the photometry sensor 71 through the focusing lens 85. An output of the photometry sensor 71 is fed to an electronic flash quenching-signal generating circuit 72, in which a quenching-signal is timely produced in accordance with the output of the photometry sensor 71, and is then output to the system control circuit 20. As soon as the quenching-signal is detected by the system control circuit 20, the energization of the flashbulb 13' by the electronic flash drive circuit 19 is stopped, whereby it can be ensured that each of the horizontal linear segments of the developed image is always illuminated with a constant quantity of light during the execution of the scanning operation.

The reading of pixel signals out of the line sensor 44 is controlled by the line sensor drive circuit 47, and the read pixel signals are amplified by an amplifier 61, and are then converted to digital pixel signals by an analog-digital (A/D) converter 62. The digital pixel signals are subjected to a shading correction, a gamma correction and so on by an image processing circuit 63 under control of the system control circuit 20, and are then temporarily stored in a memory 64, which may include an EEPROM having correction data for the shading correction. Note, the memory 64 may have a capacity for storing a single-line of digital pixel signals outputted from the line senor 44 or may have a capacity for storing a single-frame of digital pixel signals obtained by a completion of the scanning operation of the image reader 50.

The pixel signals output from the memory 64 may be optionally inputted into an interface circuit 65 through the image processing circuit 63. In this case, the pixel signals are subjected to a given processing, such as a format-conversion processing and so on, and are then output to an external processing device, such as computer, a printer, a TV monitor and so on through the interface connector 17. Also, the pixel signals output from the image processing circuit 63 may be recorded on an IC memory card. In particular, the IC memory card is loaded in an image recording device 67 through the slot 18 of the camera body 10 (FIG. 1), and the image recording device 67 is driven by a recording device control circuit 66 operated under the control of the system control circuit 20.

The release switch 14 and the scan start switch 16 are connected to the system control circuit 20, and the photographing operation and the scanning operation as mentioned above are executed by turning the switches 14 and 16 ON, respectively. Also, a flash-mode selection switch 73 is connected to the system control circuit 20, and it is determined by the flash-mode selection switch 73 whether or not the electronic flash 13 is utilized at the execution of the photographing operation. The display or LCD panel 68 is connected to the system control circuit 20 to display various setting conditions of the still video camera, suitable messages, and so on. Finally, a rotary switch 74 is connected to the system control circuit 20 for performing functions to be explained later.

Figure 3:
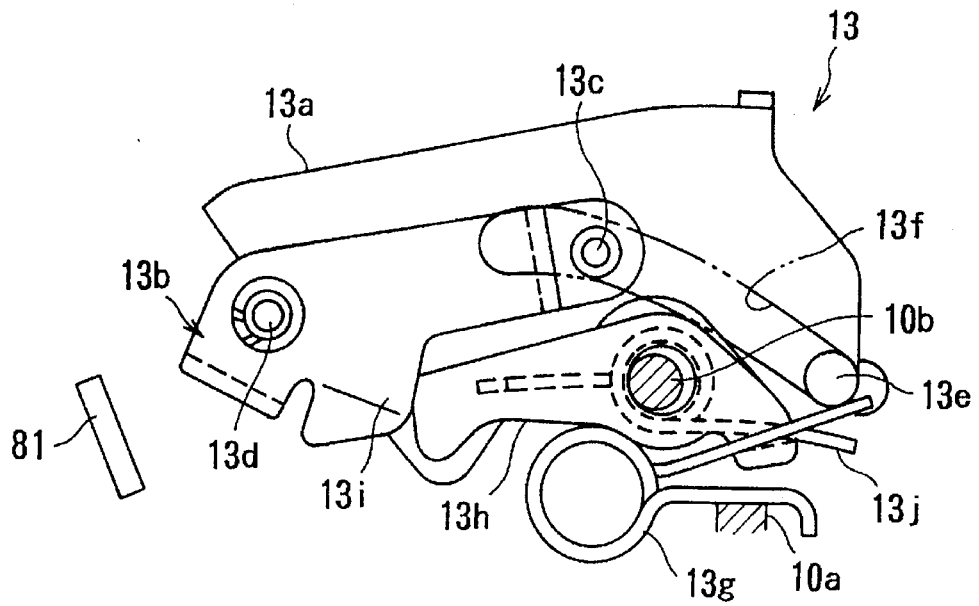
FIG. 3 is a partial side view showing a mechanical arrangement of an electronic flash incorporated in the camera.
Figure 4:
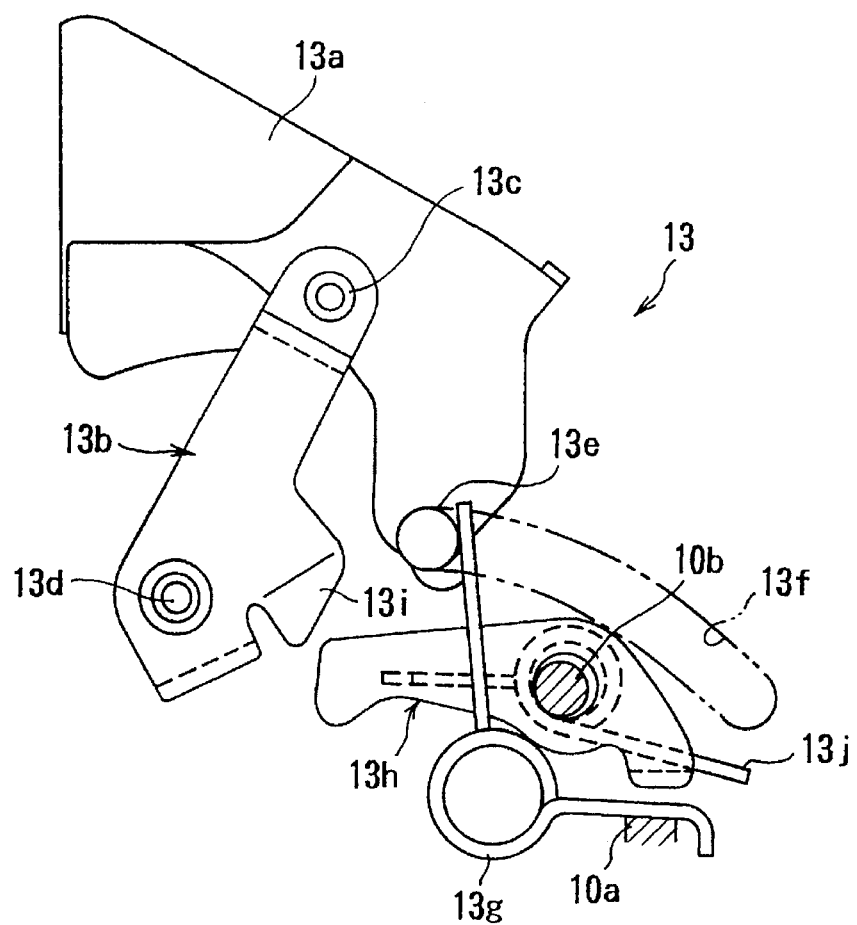
FIG. 4 is a partial side view similar to FIG. 3, showing a flash unit at a different position or pop-up position.

FIGS. 3 and 4 show a mechanical arrangement of the electronic flash 13 which comprises a flash unit 13a having the flashbulb 13' (FIG. 2) provided therein. In FIG. 3, the flash unit 13a is shown at the stowed position, and, in FIG. 4, the flash unit 13a is shown at the pop-up position. Note, in the stowed position of FIG. 3, a light emitting face of the flash unit 13a is opposed to the reflecting mirror 81 of the optical system 80 (FIG. 1).

A lever arm 13b is pivotally connected at one end thereof to a pivot pin 13c protruding from a side of the flash unit 13a, and the other end of the lever arm 13b is rotatably mounted on a shaft 13d securely supported by an inner frame provided in the camera body 10. Note, in FIGS. 3 and 4, a small part of the inner frame of the camera body 10 is illustrated and indicated by reference 10a. The flash unit 13a has a columnar projection 13e protruding from a rear end side thereof, and the columnar projection 13e is slidably received in an arc-shaped slot 13f formed in the inner frame of the camera body 10. Thus, a movement of the flash unit 13a is restricted between the stowed position shown in FIG. 3 and the pop-up position shown in FIG. 4.

A torsion spring 13g is suitably supported by the inner frame of the camera body 10 so as to act between the columnar projection 13e and the part 10a of the inner frame. Thus, the flash unit 13a is resiliently urged from the stowed position (FIG. 3) to the pop-up position (FIG. 4). Nevertheless, the flash unit 13a can be releasably locked and kept at the stowed position by a latch member 13h which can be engaged with a tag element 13i protruding from the lever arm 13b.

In particular, the latch member 13h is loosely mounted on a pin 10b protruding inward from the inner frame of the camera body 10, and is associated with a torsion spring 13j such that a right side of the latch member 13h is resiliently maintained at a lock position at which the right side of the latch member 13h is engaged with the tag element 13i of the lever arm 13b so as to prevent the movement of the flash unit 13a from the stowed position to the pop-up position, as shown in FIG. 3. Also, at the lock position, the right side of the latch member 14h is in contact with an inner end of the mechanical release button 15 (FIG. 1).

When the mechanical release button 15 is manually depressed, the right side of the latch member 13h is moved away from the viewer against a resilient force of the torsion spring 13j so that the lever arm 13b is released from the latch member 13h, resulting in the movement of the flash unit 13a from the stowed position to the pop-up position. When the flash unit 13a is manually depressed from the pop-up position toward the stowed position, a bent section of the tag element 13i comes into engagement with the right side of the latch member 13h, resulting in shifting the same out of the lock position against the resilient force of the torsion spring 13j. When the flash unit 13a reaches the stowed position, the bent section of the tag element 13i clears the right side of the latch member 13h, so that the right side of the latch member 13h is again returned to the lock position due to the resilient force of the torsion spring 13j, resulting in the engagement of the tag element 13i with the right side of the latch member 13h. Thus, the flash unit 13a is locked at the stowed position as shown in FIG. 3.

Note, although the pop-up detection switch 70 (FIG. 2) is not illustrated in FIGS. 3 and 4, it is suitably incorporated in the mechanical arrangement of the electronic flash 13.

Figure 5:
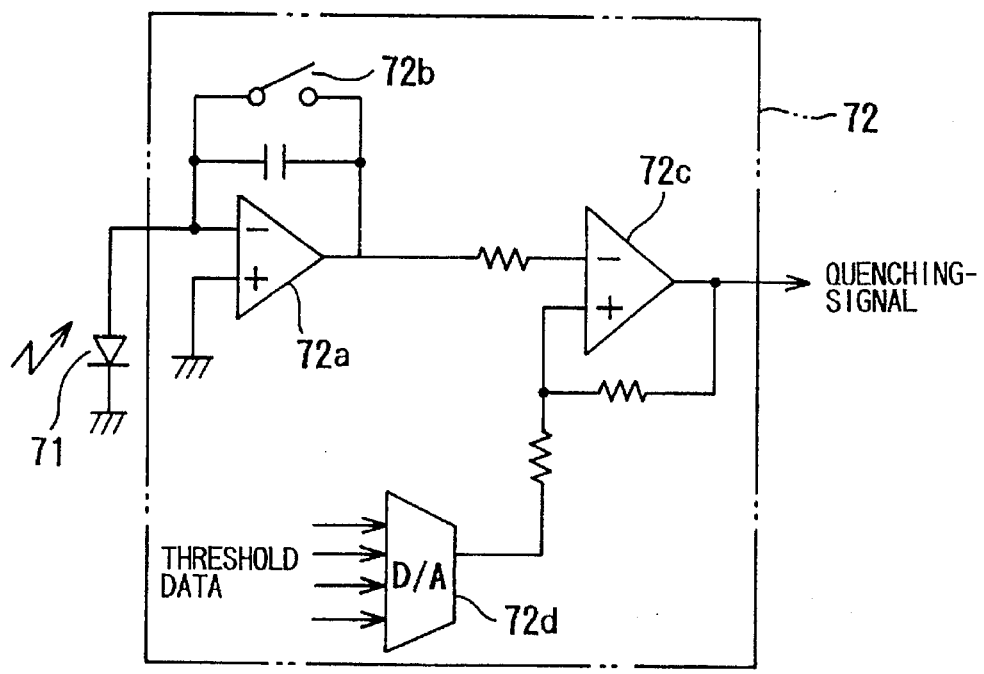
FIG. 5 is a block diagram showing an electronic flash quenching signal generating circuit for quenching an emission of light rays from the electronic flash.

FIG. 5 shows a block diagram of the electronic flash quenching-signal generating circuit 72 for timely producing the quenching-signal by which the energization of the flashbulb 13' by the electronic flash drive circuit 19 is forcibly stopped to quench the emission of light rays from the flashbulb 13'. The electronic flash quenching-signal generating circuit 72 includes an integrator 72a, an input terminal of which is connected to the photometry sensor 71. Namely, an electric signal sensed by the photometry sensor 71 is inputted to the integrator 72a through the input terminal thereof. The integrator 72a is provided with a switch 72b operated under control of the system control circuit 20, and the switch 72b is usually turned ON so that the integrator 72a is disabled.

When the switch 72b is turned OFF, the integrator 72a is enabled to integrate the electric signal inputted from the photometry sensor 71 thereto, and the integrated voltage signal is inputted to a comparator 72c through an inverting input terminal thereof. The comparator 72c has a non-inverting input terminal connected to a digital-analog converter (D/A) 72d to which four-bit threshold data is fed from the system control circuit 20. Namely, the D/A converter 72d converts the four-bit threshold data into an analog threshold voltage signal, and this threshold voltage signal is inputted to the comparator 72c through the non-inverting input terminal thereof. When the integrated voltage signal exceeds the threshold voltage signal, the comparator 72c outputs the quenching-signal to the system control circuit 20, and thus the emission of light rays from the flashbulb 13' is quenched during the energization of the flashbulb 13' by the electronic flash drive circuit 19.

Figure 6:
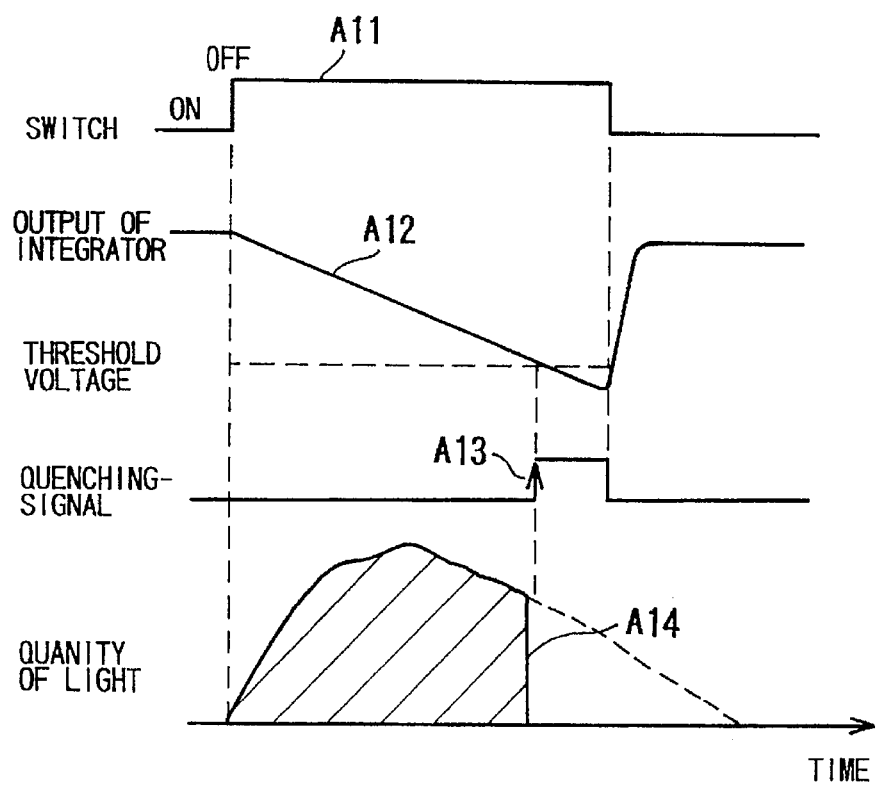
FIG. 6 is a timing chart for explaining the electronic flash quenching signal generating circuit of FIG. 5.

FIG. 6 shows a timing chart for explaining an operation of the electronic flash quenching-signal generating circuit 72.

As soon as the flashbulb 13' is electrically energized by the electronic flash drive circuit 19, switch 72b is turned OFF (reference "A11" in FIG. 6). At this times the integrated voltage signal is outputted from the integrator 72a to the comparator 72c (reference "A12" in FIG. 6). When the integrated voltage signal outputted from the integrator 72a exceeds the threshold voltage signal, the quenching-signal is outputted from the comparator 72c to the system control circuit 20 (reference "A13" in FIG. 6), and the energization of the flashbulb 13' by the electronic flash drive circuit 19 is disabled by the system control circuit 20 so that the emission of light rays from the flashbulb 13' is quenched (reference "A14" in FIG. 6). Thus, whenever the flashbulb 13' is electrically energized by the electronic flash drive circuit 19 during the execution of the scanning operation, the substantially same quantity of light rays is always emitted from the flashbulb 13' at each of the scanning steps.

The four-bit threshold data to be fed to the D/A converter 72b is changeable by manually operating the rotary switch 74 (FIG. 2) connected to the system control circuit 20. The change of the threshold data is carried out in accordance with a degree of exposure on the developed image of the electro-developing recording medium 30. Namely, the larger the degree of exposure on the developed image, the smaller a value of the threshold data, and vice versa.

Figure 7:
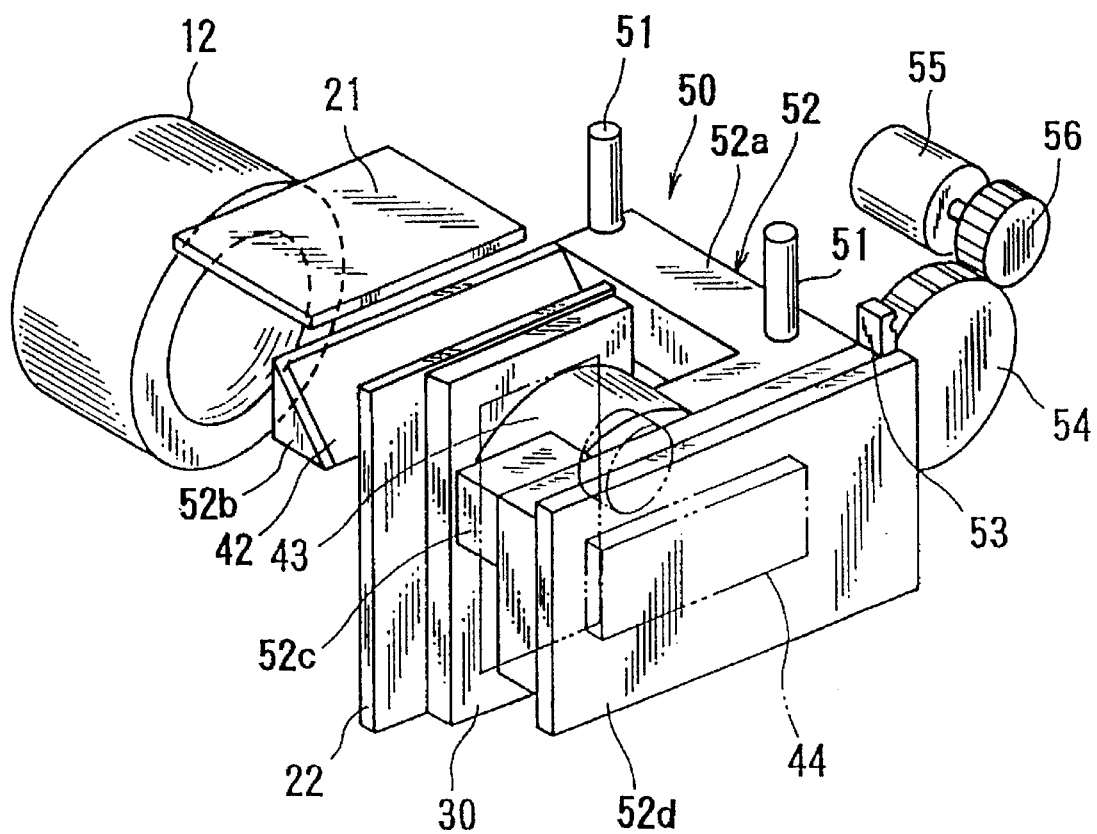
FIG. 7 is a schematic view showing an arrangement of an image reader incorporated in the camera.

FIG. 7 shows an arrangement of the scanning mechanism or image reader 50. As shown in this drawing, the carriage member 52 is slidably supported by a pair of guide shafts 51 and 51, and includes: a base portion 52a slidably engaged with the guide shafts 51 and 51; first and second leg portions 52b and 52c projecting from the base portion 52a; and a support portion 52d securely attached to a rear side of the second leg portion 52c. The first leg portion 52b is extended between the quick return mirror 21 and the shutter 22, and the second leg portion 52c is extended behind the electro-developing recording medium 30.

The respective scanner mirror 42 and scanner optical system 43 are supported by the first and second leg portions 52b and 52c so as to be aligned with each other, and are laterally and perpendicularly extended with respect to an optical axis of the photographing optical system 12. The first leg portion 52b has an isosceles-triangular cross section, and the scanner mirror 42 is fixed to an inclined face of the first leg portion 52b such that the scanner mirror 42 defines an angle of 45 degrees (135 degrees) with respect to the optical axis of the scanner optical system. The support portion 52d is formed as a holder for the line sensor 44, and the attachment of the support portion 52d to the second portion 52c is performed such that the line sensor 44 is aligned with the scanner optical system 43.

The carriage member 52 has a rack 53 fixed thereto, and the rack 53 is engaged with a pinion 54 which is meshed with a gear 56 securely mounted on an output shaft of a scan drive motor 55, such as a stepping motor, a servo-motor or the like. The drive motor 55 is driven by the scanner drive circuit 46 (FIG. 2), and thus, the carriage member 52 is moved in a direction perpendicular to the length of the line sensor 44. When an operation other than the scanning operation, e.g., the photographing operation, is executed, the carriage member 52 is removed from the optical path between the photographing optical system 12 and the electro-developing recording medium 30, so as to be positioned below the electro-developing recording medium 30. When the scanning operation is initiated, the carriage member 52 is moved from the removed position or lower position to the scan start position. Then, the carriage member is intermittently moved step by step from the scan start position toward the upper position such that the developed image of the electro-developing recording medium 30 is scanned with the light rays reflected by the scanner mirror 42 during the execution of the scanning operation.

Figure 8:
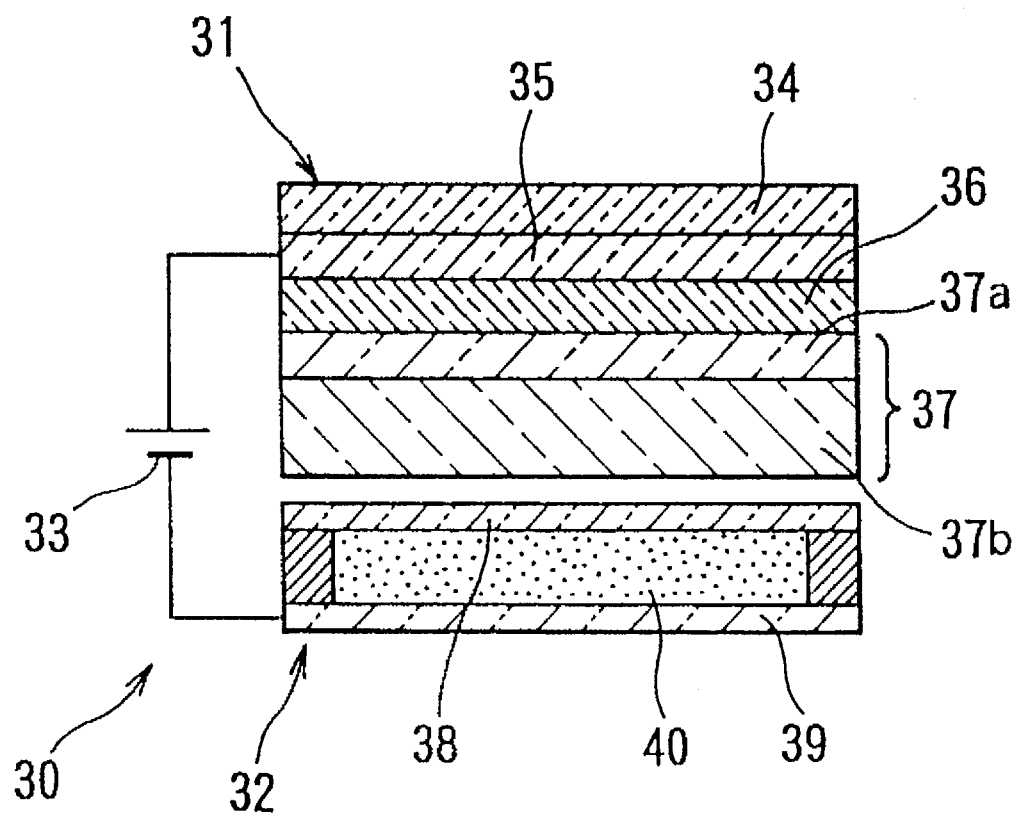
FIG. 8 is a schematic sectional view showing an electro-developing recording medium used in the camera.

FIG. 8 shows a structure of the electro-developing recording medium 30, which is identical with that disclosed in Japanese Unexamined Patent Publication No. 5-2280 and U.S. Pat. No. 5,424,156, the disclosures of which are expressly incorporated herein by reference in their entirety.

The electro-developing recording medium 30 comprises an electrostatic information recording medium 31 and an electric charge keeping medium 32, and a voltage is applied therebetween by an electric power source 33, illustrated symbolically in FIG. 8. The electric power source 33 is included in the recording medium drive circuit 41, and a recording medium activating signal (a voltage signal) is applied from the recording medium drive circuit 41 (i.e., the electric power source 33) to the electro-developing recording medium 30 during the photographing operation.

The electrostatic information recording medium 31 is formed by laminating a base plate 34, an electrode layer 35, an inorganic oxide material layer 36 and a photoconducting layer 37, and the photoconducting layer 37 is formed by laminating an electric charge generating layer 37a and an electric charge transferring layer 37b. The electric charge keeping medium 32 is formed by confining liquid crystal 40 between a liquid crystal supporting plate 38 and a liquid crystal electrode layer 39. Namely, the liquid crystal 40 is confined as a film-like layer between the supporting plate 38 and the electrode layer 39. The electric charge transferring layer 37b of the photoconducting layer 37 and the liquid crystal supporting plate 38 of the electric charge keeping medium 32 face each other with a small gap therebetween. Note, as is apparent from FIG. 8, the whole structure of the electro-developing recording medium 30 is transparent.

When the electric power source 33 included in the recording medium drive circuit 41 is turned ON, a voltage signal or recording medium activating signal is applied between the electrostatic information recording medium 31 and the electric charge keeping medium 32, i.e., between the electrode layer 35 and the liquid crystal electrode layer 39. When an optical image is formed in the electrostatic information recording medium 31 by the photographing optical system 12 during the application of the voltage signal, an electric charge distribution is produced over the electrostatic information recording medium 31 in accordance with a light intensity distribution of the optical image formed thereon, so that the intensity of an electric field acts on the liquid crystal 40 of the electric charge keeping medium 32 in accordance with the electric charge distribution. Thus, an image derived from the optical image is reproduced in the liquid crystal 40 as a visible image. Namely, as soon as the optical image is formed on the electrostatic information recording medium 31, the image is developed in the electric charge keeping medium 32.

In this embodiment, since the electric charge keeping medium 32 is constituted as a memory type liquid crystal display, the developed visible image can be kept therein even if the electric field is eliminated from the electro-developing recording medium 30. In the memory type liquid crystal display, the developed image can be erased by heating it to a given temperature, using a suitable heater. In this case, the same electro-developing recording medium 30 can be repeatedly used fop photographing.

Figure 9:
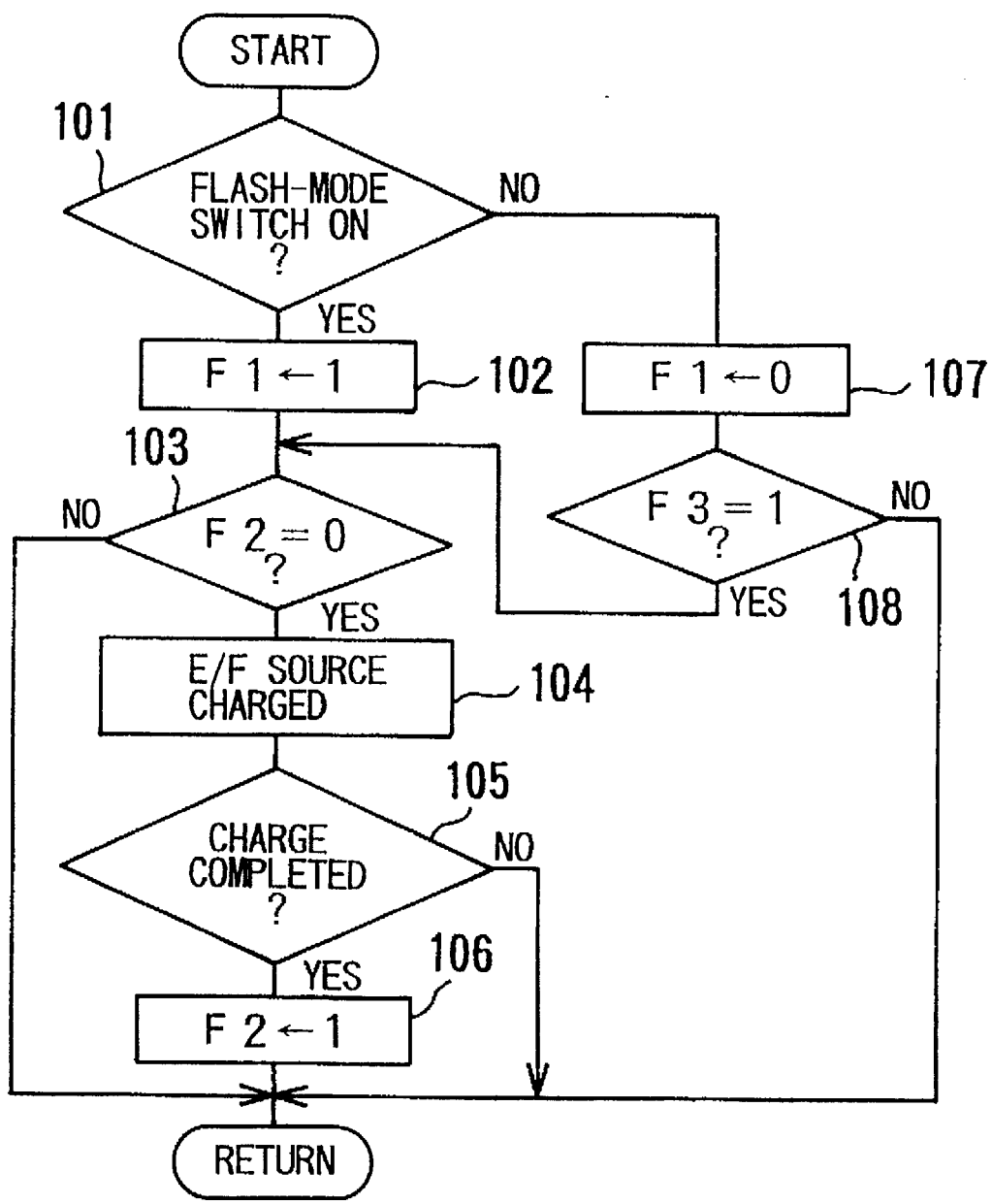
FIG. 9 is a flowchart for explaining a flash power source charging routine which is executed to control an electrical charging of a flash power source.

FIG. 9 shows a flowchart for explaining a flash power source charging routine which is executed in the system control circuit 20 to control an electrical charging of a flash power source included in the electronic flash drive circuit 19. This routine is constituted as an interrupt routine repeatedly executed at regular time intervals of, for example, 4 ms, and the execution of the routine is started by turning a power switch (not shown) of the camera ON.

At step 101, it is determined whether the flash-mode selection switch 73 is turned ON. When the flash-mode selection switch 73 is turned ON, control proceeds to step 102, in which flag F1 is made "1". Then, at step 103, it is determined whether flag F2 is "0" or "1". If F2=0, control proceeds to step 104, in which an electrical charging of the flash power source of the electronic flash drive circuit 19 is started. Note, flag F1 indicates whether the flash-mode is selected by the flash-mode selection switch 73.

At step 105, it is determined whether the electrical charging of the flash power source is completed. If the electrical charging of the flash power source is not completed, the routine is once ended. Thereafter, although the execution of the routine is repeated at intervals of 4 ms, there is no progress until the electrical charging of the flash power source is completed.

When the completion of the electrical charging of the flash power source is confirmed, control proceeds to step 106, in which flag F2 is made "1". Note, flag F2 indicates whether electrical charging of the flash power source is completed.

At step 103, if flag F2=1, i.e., if the electrical charging of the flash power source is completed, the routine is once ended. Thereafter, although the execution of the routine is repeated at intervals of 4 ms, there is no progress until flag F2 is made "0", i.e., until a discharging of the flash power source is carried out.

At step 101, if the flash-mode selection switch 73 is turned OFF, control proceeds to step 107, in which flag F1 is made "0". Then, at step 108, it is determined whether flag F3 is "1" or "0". As is apparent hereinafter, whenever the execution of the scanning operation is started, flag F3 is made "1", and, whenever the execution of the scanning operation is ended, flag F3 is made "0". If flag F3=1, control proceeds from the step 108 to step 103. On the other hand, at step 108, if flag F3=0, the routine is once ended. Thereafter, although the execution of the routine is repeated at intervals of 4 ms, there is no progress until the flag F3 is made "1".

Figure 10:
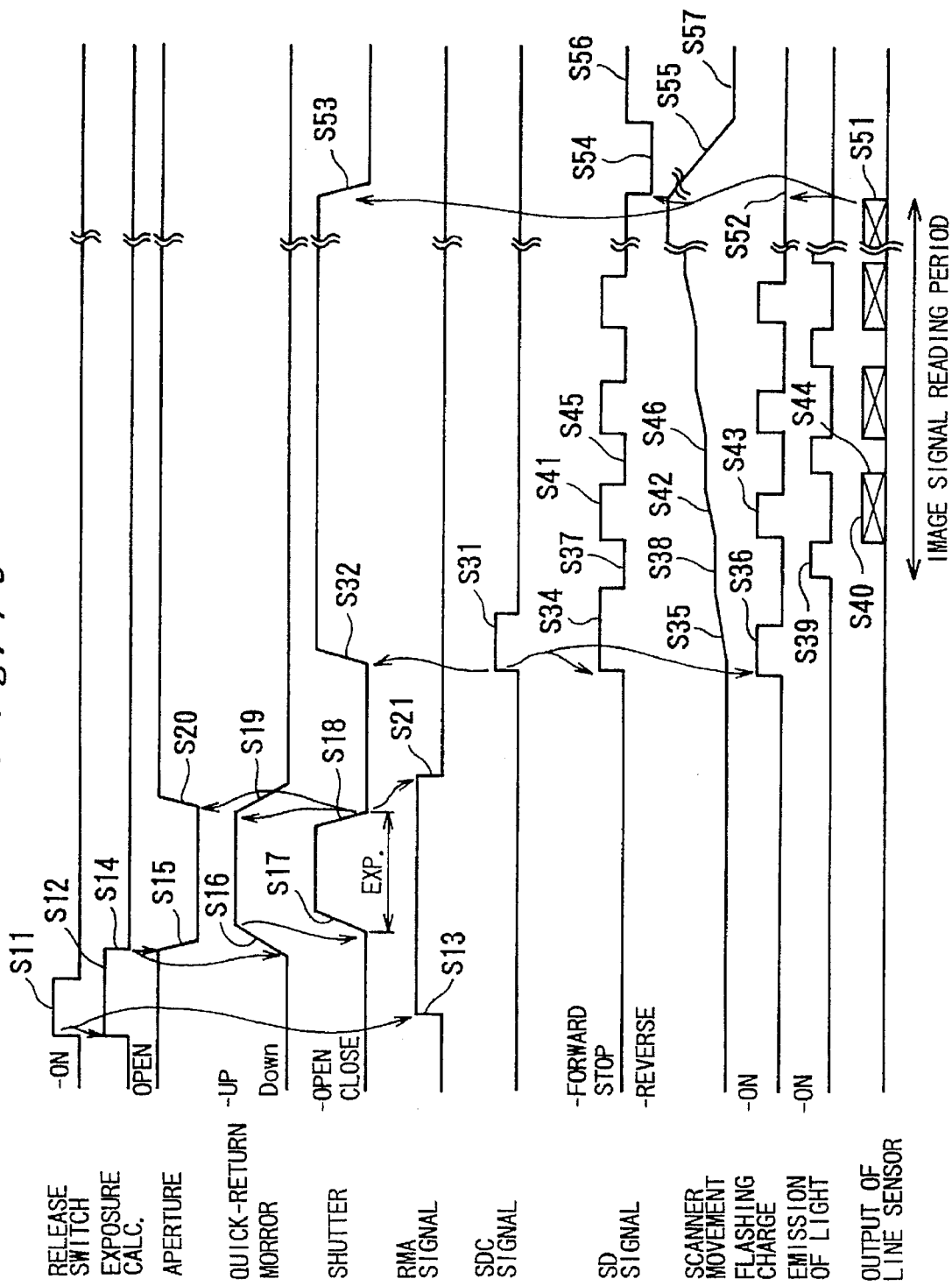
FIG. 10 is a timing chart for explaining a whole operation of the camera.
Figure 11:
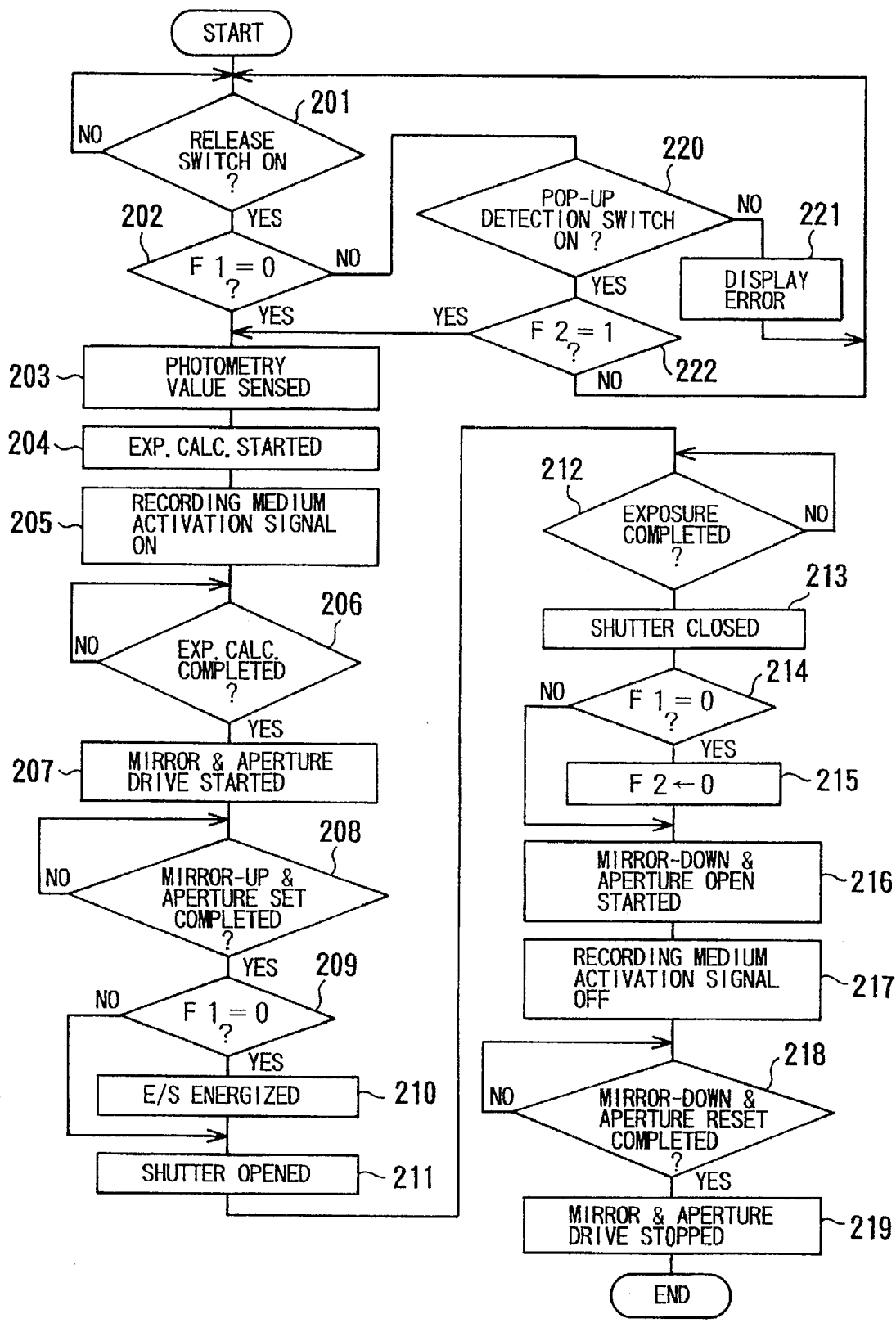
FIG. 11 is a flowchart for explaining a photographing operation of the camera.

FIG. 10 shows a timing chart for explaining a whole operation of the camera, and FIG. 11 shows a flowchart for explaining a photographing operation of the camera. With reference to these drawings, the photographing operation will be explained below.

At step 201, it is determined whether the release switch 14 has been turned ON. If the turn-ON of the release switch 14 has been carried out, a command signal for executing the photographing operation is made ON (reference "S11" in FIG. 10), and is inputted to the system control circuit 20.

At the step 202, it is determined whether flag F1 is "0" or "1", i.e., it is determined whether the flash-mode selection switch 73 is turned ON. If F1=0, i.e., if the electronic flash 13 is not utilized at the execution of the photographing operation, control proceeds to step 203, in which an output signal of the photometry sensor 28, i.e., a photometry value, is sensed and fetched by the system control circuit 20.

At step 204, an exposure calculation is started based on the fetched photometry value (reference "S12" in FIG. 10). After a predetermined period of time has elapsed from the ON operation of the release switch 14, control proceeds to step 205, in which a recording medium activating signal outputted from the recording medium drive circuit 41 to the electro-developing recording medium 30 is made ON (reference "S13" in FIG. 10). Namely, the recording medium activating signal is changed from the low level to the high level, so that the activating voltage is applied between the electrostatic information recording medium 31 and the electric charge keeping medium 32.

Then, at step 206, it is determined whether the exposure calculation has been completed. When the exposure calculation has been completed (reference "S14" in FIG. 10), the procedures necessary for the photographing operation are subsequently carried out in the following steps on the basis of the calculated result.

At step 207, an opening area of the aperture 12a is adjusted in accordance with the calculated result. Note, since the aperture 12a initially has a fully-open area, the adjustment of the aperture 12a is usually carried out such that the fully-open area thereof is made small (reference "S15" in FIG. 10). Also, at step 207, the quick return mirror 21 is changed from the down-position to the up-position (reference "S16" in FIG. 10).

At step 208, it is determined whether the quick return mirror 21 has been changed from the down-position to the up-position, and whether the aperture 12a has been adjusted. When the change of the quick return mirror 21 from the down-position to the up-position and the adjustment of the aperture 12a are completed, control proceeds to step 209, in which it is determined whether flag F1 is made "0" or "1". If flag F1=0, i.e., if the flash-mode selection switch 73 is turned OFF, control skips over step 210, and control proceeds to step 211, in which the shutter 22 is opened (reference "S17" in FIG. 10), whereby an optical image is focussed and formed on the electro-developing recording medium 30 in the above-mentioned manner.

At step 212, it is determined whether an exposure period of time, which is designated by the calculated result, has elapsed. When the exposure period of time has elapsed, i.e., when the exposure has been completed, control proceeds to step 213, in which the shutter 22 is closed (reference "S18" in FIG. 10). After the closing of the shutter 22 is completed, control proceeds to step 214, in which it is determined whether flag F1 is made "0" or "1". If flag F1=0, control skips over step 215, and control proceeds to step 216, in which the quick return mirror 21 is returned from the up-position to the down-position (reference "S19" in FIG. 10), and in which the opening area of the aperture 12a is returned to the fully-open area (reference "S20" in FIG. 10). Then, at step 217, the output voltage of the recording medium activating signal is made OFF (reference "S21" in FIG. 10), i.e., the recording medium activating signal is returned from the high level to the low level.

Namely, the output of the recording medium activating signal to the electro-developing recording medium 30 is at least kept on during the period of time during which the shutter 22 is opened, whereby recording and development of the optical image can be carried out in the electro-developing recording medium 30. As mentioned above, the electric charge keeping medium 32 of the electro-developing recording medium 30 is constituted as a memory type liquid crystal display, and thus the developed image can be held therein even if the output of the recording medium activating signal is stopped.

At step 218, it is determined whether the quick return mirror 21 has moved to the initial position or down-position, and whether the opening area of the aperture 12a has returned to the initial area or fully-open area. When the quick return mirror 21 and the aperture 12a are initially reset, control proceeds to step 219, in which the driving of the quick return mirror 21 and the aperture 12a are stopped. Thus, the photographing operation without the utilization of the electronic flash 13 is ended.

At step 202, if flag F1=1, i.e., if the electronic flash 13 is utilized at the execution of the photographing operation, control proceeds from step 202 to step 220, in which it is determined whether or not the pop-up detection switch 70 is turned ON. If the pop-up detection switch 70 is OFF, i.e., the electronic flash 13 is at the stowed position, control proceeds to step 221, in which an error massage warning that the flash-mode photographing operation is impossible is displayed on the display 68. Then, control returns to step 201.

At step 220, if the pop-up detection switch 70 is turned ON, control proceeds to step 222, in which it is determined whether flag F2 is "1" or "0". If flag F2=0, i.e., if the electrical charging of the flash power source included in the electronic flash drive circuit 19 is not completed, control returns to step 201.

At step 222, if flag F2=1, i.e., if the electrical charging of the flash power source is completed, control proceeds from step 222 to step 203, and the procedures necessary for the photographing operation are subsequently carried out, as mentioned above.

In the flash-mode photographing operation, since flag F1=1, control proceeds from step 209 to step 210, in which the electronic flash 13, and therefore the flashbulb 13', is electrically energized by the flash power source of the electronic flash drive circuit 19. Similarly, control proceeds from step 214 to step step 215, in which flag F2 is made "0".

In the operation as mentioned above, the recording medium activating signal may be outputted just before the exposure is started, i.e., just before the shutter 22 is opened, if necessary. In this cases in the flow chart of FIG. 11, step 205 is positioned between steps 208 and 209.

Figure 12:
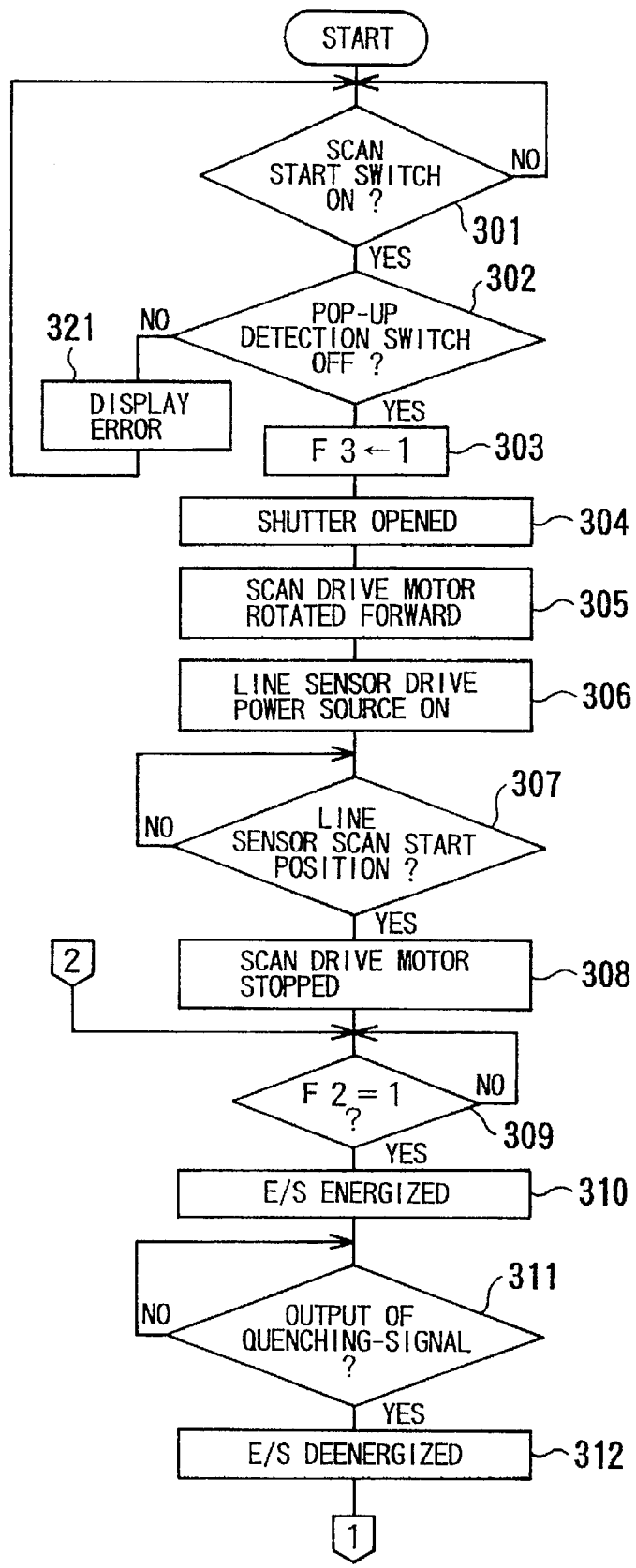
FIG. 12 is a part of a flowchart for explaining a scanning operation of the camera.
Figure 13:
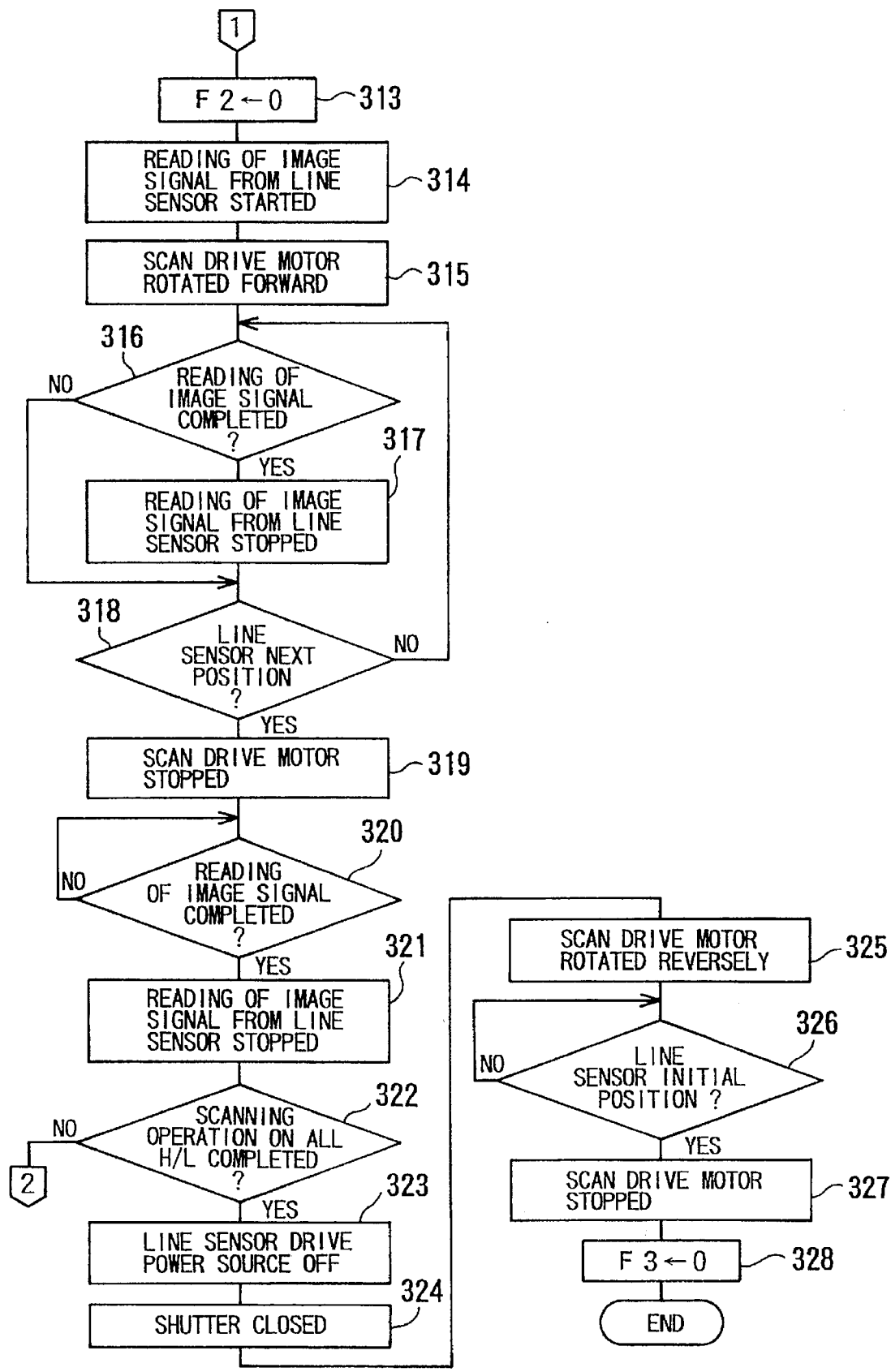
FIG. 13 is the other part of the flowchart for explaining a scanning operation of the camera shown.

FIGS. 12 and 13 show a flowchart for explaining a scanning operation for optically and electronically sensing and reading the developed image held in the electro-developing recording medium 30. With reference to FIG. 9, and FIGS. 12 and 13, the scanning operation will be now explained below.

At step 301, it is determined whether the scan start switch 16 has been made ON. If the turn-ON of the scan start switch 16 has been carried out, a scanner drive command signal for executing the scanning operation is made ON (reference "S31" in FIG. 10), and is inputted to the system control circuit.

At step 302, it is determined whether the pop-up detection switch 70 is turned OFF, i.e., it is determined whether the electronic flash 13 is at the stowed position. If the pop-up detection switch 70 is turned OFF, control proceeds from step 302 to step 303, in which flag F3 is made "1", whereby the electric charging of the flash power source of the electronic flash drive source 19 is started (reference "S36" in FIG. 10), as apparent from the flowchart of FIG. 9.

At step 304, the shutter 22 is opened (reference "S32" in FIG. 10), and control proceeds to step 305, in which a scanner drive signal, outputted from the system control circuit 20 to the scanner drive circuit 46, is changed from the zero level to the positive level (reference "S34" in FIG. 10), so that the scan drive motor 55 is driven in a forward direction due to the drive pulses outputted from the scanner drive circuit 46 thereto, whereby the carriage member 52 of the scanning mechanism 50 starts to move upward from the lower position or removal position toward the scanning start position or image-reading start position (reference "S35" in FIG. 10). Subsequently, at step 306, a line sensor drive power source included in the line sensor drive circuit 47 is made ON.

At step 307, it is determined whether the carriage member 52 carrying the scanner mirror 42 and the line sensor 44 has been moved to the image-reading start position. When the carriage member 52 reaches the image-reading start position, control proceeds to step 308, in which the scanner drive signal outputted from the system control circuit 20 to the scanner drive circuit 46 is returned from the positive level to the zero level (reference "S37" in FIG. 10), and thus the output of the drive pulses from the scanner drive circuit 46 to the scan drive motor 55 is interrupted to thereby stop the scan drive motor 55 (reference "S38" in FIG. 10), whereby the carriage member 52 carrying the scanner mirror 42 and the line sensor 44 is held at the image-reading start position. Note, the standing still of the carriage member 52 at the image-reading start position may be controlled by, for example, counting the driving pulses outputted from the scanner drive circuit 46 to the scan drive motor 55.

At step 309, it is determined whether flag F2 is "0" or "0". If flag F2=1, i.e., if the electrical charging of the flash power source is completed, control proceeds from step 309 to step 310, in which the electronic flash 13, and therefore the flashbulb 13', is electrically energized by the flash power source of the electronic flash drive circuit 19 (reference "S39" in FIG. 10). The light rays emitted from the flashbulb 13' are directed to the scanner mirror 42, and are then reflected by the mirror 42 to the line sensor 44 through the electro-developing recording medium 30 and the scanner optical system 43.

At step 311, it is determined whether a quenching signal is outputted from the electronic flash quenching-signal generating circuit 72. When the output of the quenching signal from the quenching-signal generating circuit 72 is confirmed, control proceeds from step 311 to step 312, in which the energization of the flashbulb 13' by the flash power source of the electronic flash drive circuit 19 is stopped. Then, at step 313, flag F2 is made "0", whereby the electrical charging of the flash power source of the electronic flash drive circuit 19 is again started.

At step 314, a reading-scan of image signals from the line sensor 44, (i.e., a first horizontal-scanning line) is started by the line sensor drive circuit (reference "S40" in FIG. 10). Then, at step 315, the scanner drive signal output from the system control circuit 20 to the scanner drive circuit 46 is changed from the zero level to the positive level (reference "S41" in FIG. 10), so that the scan drive motor 55 is driven in the forward direction due to the drive pulses outputted from the scanner drive circuit 46 thereto, whereby the carriage member 52 carrying the scanner mirror 42 and the line sensor 44 is moved upward (reference "S42" in FIG. 10).

During the movement of the carriage member 52, it is determined at step 316 whether the reading-scan of image signals from the line sensor 44 has been completed. If the completion of the reading-scan is confirmed, control proceeds to step 317, in which the reading-scan of image signals from the line sensor 44 is stopped (reference "S44" in FIG. 10). Note that the completion of the reading-scan can be known by, for example, counting reading-clock pulses output from the line sensor drive circuit 47 to drive the line sensor 44.

At step 316, if the completion of the reading-scan is not confirmed, control skips over step 317, and then control proceeds to step 318, in which it is determined whether the carriage member 52 carrying the scanner mirror 42 and the line sensor 44 has been moved to a next image-reading position (corresponding to a position at which the image signals included in a subsequent horizontal scanning line are read). If the carriage member 52 has not reached the next image-reading position, the control returns to step 316, and the routine including steps 316, 317, and 318 is repeated until the line sensor 44 reaches the next image-reading position.

At step 316, if the completion of the reading-scan is confirmed, control proceeds to step 317, in which the reading-scan of image signals from the line sensor 44 is stopped. Then, control proceeds to step 318.

At step 318, when it is confirmed that the carriage member 52 carrying the scanner mirror 42 and the line sensor 44 has reached the next image-reading position, control proceeds from step 318 to step 319, in which the scanner drive signal outputted from the system control circuit 20 to the scanner drive circuit 46 is returned from the positive level to the zero level (reference "S45" in FIG. 10), and thus, the output of the drive pulses from the scanner drive circuit 46 to the scan drive motor 55 is interrupted to thereby stop the scan drive motor 55, whereby the carriage member 52 is held at the next image-reading position (reference "S46" in FIG. 10). Similarly, the standing still of the carriage member 52 at the next image-reading position can be controlled by counting the driving pulses outputted from the scanner drive circuit 46 to the scan drive motor 55.

Then, at step 320, it is again determined whether the reading-scan of the single-line of image signals from the line sensor 44 has been completed. This is because control may proceed from step 318 to step 319 without having any access to step 317, i.e., because there may be a case where the reading-scan of the image signals from the line sensor 44 is not yet completed even after the carriage member 52 reaches the next image-reading position. When the completion of the reading-scan is confirmed at step 320, control proceeds to step 321, in which the operation for the reading-scan is stopped.

At step 322, it is determined whether the whole of the developed image has been completely read, i.e., the reading-scans have been completed on all of the horizontal-scanning lines defined by intervals of the intermittent movements of the line sensor 44. This determination is made possible by, for example, counting the drive pulses output from the scanner drive circuit 46. If the whole of the developed image has not been completely read, control returns to step 309. Namely, the routine including steps 309 to 322 is repeated until the reading-scans are completed on all of the horizontal-scanning lines. Note, in this embodiment, all of the horizontal-scanning lines may be a number of about 2,000.

At step 322, when the whole of the developed image has been completely read (reference "S51" in FIG. 10), control proceeds to step 323, in which the line sensor drive power source included in the line sensor drive circuit 47 is made OFF. Then, at step 324, the shutter 22 is closed (reference "S53" in FIG. 10). Subsequently, at step 325, the scanner drive signal outputted from the system control circuit 20 to the scanner drive circuit 46 is changed from the zero level to the negative level (reference "S54" in FIG. 10), so that the scan drive motor 55 is driven in a reverse direction due to the drive pulses outputted from the scanner drive circuit 46 thereto, whereby the carriage member 52 of the scanning mechanism 50 starts to move downward toward the lower position or removal position (reference "S55" in FIG. 10).

At step 326, it is determined whether the carriage member 52 has been moved to the lower position or removal position. When the carriage member 52 reaches the removal position, control proceeds to step 327, in which the scanner drive signal outputted from the system control circuit 20 to the scanner drive circuit 46 is returned from the negative level to the zero level (reference "S56" in FIG. 10), and thus the output of the drive pulses from the scanner drive circuit 46 to the scan drive motor 55 is stopped, i.e., the scan drive motor 55 is stopped (reference "S57" in FIG. 10), whereby the carriage member 52 is held at the removal position thereof. The standing still of the carriage member 52 at the removal position may be known by detecting a part of the carriage member 52 with, for example, a photo-interrupter type detector (not shown). Then, at step 328, flag F3 is made "0", and the routine of FIGS. 12 and 13 is ended.

At step 302, if the pop-up detection switch 70 is turned ON, i.e., if the electronic flash 13 is at the pop-up position, control proceeds to step 329, in which an error massage warning that the scanning operation is impossible is displayed on the display 68. Then, control returns to step 301.

As is apparent from the foregoing, according to the present invention, the electronic flash 13 is utilized as a light source for illuminating the developed image of the electro-developing recording medium at the execution of the scanning operation. Accordingly, the image reader for optically and electronically reading the developed image of the electro-developing recording medium can be compactly arranged, because no additional or separate scanning light source is required, as is necessary in the prior art device described above.

Finally, it will be understood by those skilled in the art that the foregoing description is of preferred embodiments of the disclosed electro-developing type camera, and that various changes and modifications may be made to the present invention without departing from the spirit and scope thereof.

The present disclosure relates to subject matter contained in Japanese Patent Application No. 7-182095 (filed on Jun. 26, 1995), which is expressly incorporated herein, by reference, in its entirety.

We claim:

1. An electro-developing type camera using an electro-developing recording medium, comprising:

photographing means for forming an optical image of an object to be photographed in said electro-developing recording medium;

flash means for selectively emitting light rays to illuminate the object at an execution of a photographing operation;

image-sensing means for optically and electronically sensing said optical image formed in said electro-developing recording medium; and optical guide system means for guiding said light rays, emitted from said flash means, to said electro-developing recording medium to illuminate said image formed therein during said optical and electronic sensing executed by said image-sensing means.

2. An electro-developing type camera as set forth in claim 1, wherein said flash means comprises a pop-up type flash which is movable between a pop-up position for said photographing operation and a stowed position for said optical and electronic sensing of said formed image of said electro-developing recording medium.

3. An electro-developing type camera as set forth in claim 2, further comprising:

position detection means for detecting which position of said flash means is selected;

means for disabling said photographing operation when said flash means is positioned at said stowed position; and means for disabling said optical and electronic sensing of said formed image of said electro-developing recording medium when said flash means is positioned at said pop-up position.

4. An electro-developing type camera as set forth in claim 1, wherein said optical and electronic sensing of said formed image of said electro-developing recording medium is carried out as a scanning operation, in which said formed image of said electro-developing recording medium is scanned by the illumination of light rays guided by said optical guide means.

5. An electro-developing type camera as set forth in claim 4, further comprising:

optical detection means for detecting a part of said light rays emitted from said flash means; and emission controlling means for controlling said emission of light rays from said flash means so as to keep an amount of light rays for said illumination of said formed image of said electro-developing recording medium constant at each of a plurality of scanning steps.

6. An electronic color still video camera as set forth in claim 4, wherein said image-sensing means includes a carriage member carrying a scanner mirror, a scanner optical system, and a line sensor aligned with each other and supported thereby, and is intermittently moved, step by step, along said electro-developing recording medium during said scanning operation, such that said electro-developing recording medium passes through a space between said scanner mirror and said scanner optical system, and wherein said scanner mirror is arranged to reflect said light rays, guided by said optical guide means, to said scanner optical system by which said light rays are focused on a linear light receiving surface of said line sensor.

7. An electro-developing type camera using an electro-developing recording medium, comprising:

photographing means for forming an optical image of an object to be photographed in said electro-developing recording medium;

flash means for selectively emitting light rays to illuminate the object at an execution of a photographing operation;

image sensing means for executing a scanning operation to optically and electronically sense said formed image of said electro-developing recording medium, said scanning operation including a plurality of scanning steps carried out by intermittently and relatively moving an image reader means with respect to said formed image of said electro-developing recording medium; and optical guide system means for guiding said light rays, emitted from said flash means, to said image sensing means which illuminates said formed image of said electro-developing recording medium with said guided light rays for said optical and electronic sensing of said formed image thereof, wherein an emission of light rays from said flash means is carried out whenever each of the scanning steps of said scanning operation is executed by said image sensing means.

8. An electro-developing type camera as set forth in claim 7, wherein said flash means comprises a pop-up type flash which is movable between a pop-up position for said photographing operation and a stowed position for said scanning operation.

9. An electro-developing type camera as set forth in claim 8, further comprising:

position detection means for detecting a selected position of said flash means;

means for disabling said photographing operation when positioning said flash means at said stowed position; and means for disabling said scanning operation when positioning said flash means at said pop-up position.

10. An electro-developing type camera as set forth in claim 7, further comprising:

optical detection means for detecting a part of said light rays emitted from said flash means; and emission controlling means for controlling said emission of light rays from said flash means so as to keep an amount of light rays for the illumination of said formed image of said electro-developing recording medium constant at each scanning step of said scanning operation.

* * * * *